US005615050A

United States Patent [19]

Kant

[11] Patent Number: 5,615,050
[45] Date of Patent: Mar. 25, 1997

[54] OPTICAL SYSTEM WITH REDUCED FOCUS SPOT SIZE

[75] Inventor: Rishi Kant, Mountain View, Calif.

[73] Assignee: International Business Machines Corporation, Armonk, N.Y.

[21] Appl. No.: 571,704

[22] Filed: Dec. 6, 1995

Related U.S. Application Data

[63] Continuation of Ser. No. 117,582, Sep. 2, 1993, abandoned.

[51] Int. Cl.[6] .................................................. G02B 13/18
[52] U.S. Cl. ............................................ 359/711; 369/112
[58] Field of Search .................................. 359/711, 662, 359/708, 737, 565, 569; 369/112

[56] References Cited

U.S. PATENT DOCUMENTS

| | | | |
|---|---|---|---|
| 3,581,099 | 5/1971 | Franke | 359/711 |
| 3,816,160 | 6/1974 | Moore | 359/652 |
| 3,848,970 | 11/1974 | Goodell | 359/716 |
| 4,429,957 | 2/1984 | King | 350/423 |
| 4,712,884 | 12/1987 | Sakuma et al. | 359/711 |
| 4,790,612 | 12/1988 | Dickson | 350/3.69 |
| 4,961,622 | 10/1990 | Gorman et al. | 359/720 |
| 4,997,250 | 3/1991 | Ortiz, Jr. | 359/737 |
| 5,087,983 | 2/1992 | Takahashi et al. | 359/711 |
| 5,132,843 | 7/1992 | Aoyama et al. | 359/573 |

FOREIGN PATENT DOCUMENTS

| | | | |
|---|---|---|---|
| 63-208821 | 8/1988 | Japan | G02B 27/00 |
| 291829 | 9/1988 | Japan | G11B 7/125 |
| 2206036 | 8/1990 | Japan | G11B 7/13 |
| 2206035 | 8/1990 | Japan | G11B 7/31 |
| 2291948 | 12/1990 | Japan | G11B 7/135 |
| 3260602 | 11/1991 | Japan | G02B 3/00 |
| 3254433 | 11/1991 | Japan | G11B 7/135 |

OTHER PUBLICATIONS

Hideo Ando, "Phase–Shifting Apodizer Of Three or More Portions" Japan Journal of Applied Physics, vol. 31, 1992, Part 1 No. 2B No Month Available.

G. Indebetouw, "Nondiffracting Optical Fields", Journal of the Optical Society of America, vol. 6, No. 1, Jan. 1989.

Yamanaka, et al, "High Density Optical Recording by Superresolution" Japan Journal of Applied Physics, vol. 28, 1989, p. 197: No Month Available.

*Primary Examiner*—Georgia Y. Epps
*Assistant Examiner*—Dawn-Marie Bey
*Attorney, Agent, or Firm*—Douglas R. Millett; Noreen A. Krall

[57] ABSTRACT

A toroidal lens has a first surface comprised of a convex curve rotated about a central axis and a second surface comprised of a concave curve rotated about the central axis. The toroidal lens receives a radiation beam and produces an annular or halo shaped radiation beam. This resulting annular beam is focussed by a focussing lens to a reduced focus spot size without sacrificing depth of focus.

24 Claims, 3 Drawing Sheets

OPTICAL SYSTEM WITH REDUCED FOCUS SPOT SIZE

This is a continuation of U.S. application Ser. No. 08/117,582 filed Sep. 2, 1993 now abandoned.

BACKGROUND OF THE INVENTION

1. Field of the Invention

The present invention relates generally to optical focus systems and more particularly to an optical system which uses a toroidal lens.

2. Description of the Prior Art

Optical data storage systems provide a means for storing great quantities of data on a disk storage medium. The data is recorded onto the disk by means of focussing a high power laser beam to create spots on the disk medium. The data is then accessed by focussing a low power laser beam onto the recorded spots of the disk and then detecting the information encoded in the reflected light beam.

Objective lenses with relatively large numerical apertures (NA), typically 0.55, are used to focus the laser beam to the spot on the medium. If a large NA lens is used, the spot size can be made smaller and more data may be recorded in a given disk space. However, the higher NA lenses also reduce the depth of focus. The focal point of a lens is actually a substantially cylindrical volume. The depth of focus is the length of the cylinder. If the depth of focus is very small, then the lens must be precisely positioned in order to keep the beam properly focussed on the medium. This places high performance requirements on the focus actuator of the optical data storage system. Therefore, it is desirable to find some way to decrease the spot size while at the same time maintaining or increasing the depth of focus.

Various references have proposed ways to reduce the focus spot size. These references include beam obscuration devices, (JP 02-206036; JP 02-206035; JP 02-91829); diffraction gratings (U.S. Pat. No. 5,132,843; JP 03-254433); phase shifting devices (Hideo Ando, "Phase-Shifting Apodizer Of Three or More Portions", Japan Journal of Applied Physics, Volume 31, 1992, Part 1, Number 2B); axicon lenses (G. Indebetouw, "Nondiffracting Optical Fields", Journal of the Optical Society of America, Volume 6, Number 1, January 1989, Page 150; JP 02-294948; JP 63-208821); Rhomboid Prisms (Yamanaka, et al, "High Density Optical Recording by Superresolution", Japan Journal of Applied Physics, Volume 28, 1989, Page 197; JP 60-191689); and other beam manipulation systems (JP 03-260602; U.S. Pat. Nos. 4,429,957; 4,790,612). However, these systems require complex optical elements and precise alignment along the central axis of a light beam. Some of the systems are also very wasteful of light. A combination of these problems makes these schemes impractical for use in optical data storage systems.

What is needed is an optical system which provides decreased focus spot size without decreasing the depth of focus and is suitable for use in optical data storage systems.

SUMMARY OF THE INVENTION

In a preferred embodiment of the invention, an optical system comprises a laser for generating a laser beam, a collimation lens, a toroidal lens, an annular phase plate, and a focusing lens. The toroidal lens has a first surface which is comprised of a convex curve rotated about a central axis and second surface which is comprised of a concave curve rotated about the central axis. The toroidal lens modifies the incoming beam and produces an annular or halo shaped beam. The focussing lens is then able to focus this halo shaped beam to a smaller spot size. The annular phase plate adjusts the phase of an outer portion of a beam relative to an inner portion of the beam and further reduces the focus spot size.

For a fuller understanding of the nature and the advantages of the present invention reference should be made to the following detailed description taken in conjunction with the accompanying drawings.

DESCRIPTION OF THE PREFERRED EMBODIMENTS

Figure 1:
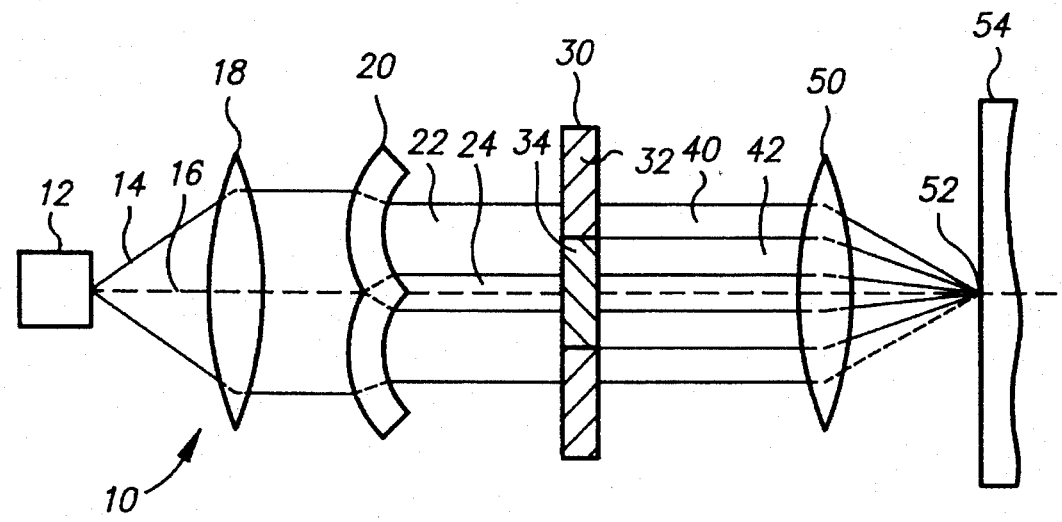
FIG. 1 is a schematic diagram of an optical system of the present invention.

FIG. 1 shows a schematic diagram of an optical system of the present invention and is designated by the general reference number 10. A laser 12 produces a laser beam 14 having a central axis 16. Beam 14 is collimated by a collimating lens 18. The beam 14 enters a toroidal lens 20. Toroidal lens 20 is also known as a ring lens. Toroidal lens 20 shifts the intensity of beam 14 such that the beam 14 has an outer annular portion 22 and a central portion 24 which has no light at all.

The beam 14 then enters a phase plate 30. The plate 30 has an outer portion 32 and an inner circular portion 34. Portion 34 is a half waveplate which shifts the phase of the light passing through it by one half of a wavelength. Portion 32 is a nonwaveplate and does not shift the phase of light passing through it. The diameter of the circular portion 34 (WD) is less than the diameter of the outer portion 22 of beam 14 (OD) and greater than the diameter of the inner beam portion 24 (ID). In a preferred embodiment, WD is approximately equal to (OD+ID)/2.

After passing through plate 30, the portion 22 of beam 14 is further divided into an outer annular portion 40 and inner annular portion 42. The inner annular portion 42 has a phase shift of one half of a wavelength (180 degrees) from the phase of the outer annular portion 40.

The beam 14 enters a focussing lens 50 which focuses beam 14 to a focus spot 52 on a target object 54. The lens 50 may have a numerical aperture of 0.55. The result is that the focus spot 52 has a much smaller diameter than can be achieved without the use of the toroidal lens 20 and plate 30. A normal beam has a Gaussian shaped intensity distribution which will contain side lobes after it is focused through lens 50. Side lobes are high order modes of light which are created by refraction. The side lobes increase the diameter of the focus spot. The use of the torodial lens 20 creates a halo beam which eliminates much of the side lobes and permits the light to be focussed to a smaller spot. The addition of the plate 30 and the resulting phase shift of a portion of the light beam further reduces the side lobes.

Figure 2:
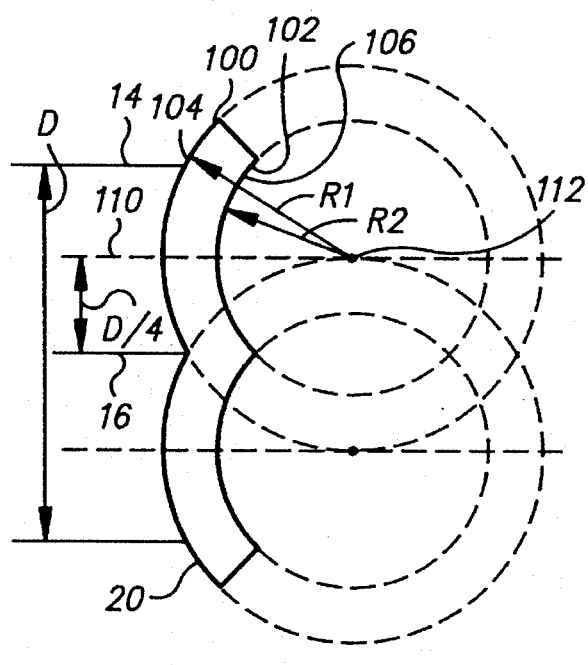
FIG. 2 is a cross sectional view of a toroidal lens of the present invention.
Figure 3:
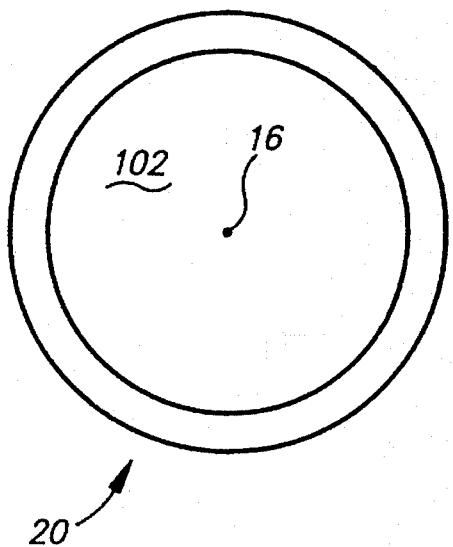
FIG. 3 is a frontal view of lens of FIG. 2.

FIGS. 2 and 3 show a cross sectional view and a frontal view, respectively, of torodial lens 20. Lens 20 is made of a high grade optical glass. The lens 20 has an entrance surface 100 and an exit surface 102. Entrance surface 100 is defined by a convex curve 104 which is rotated about axis 16. Exit surface 102 is defined by a concave curve 106 which is rotated about axis 16.

Beam 14 with central axis 16 has a beam diameter D. Diameter D is the diameter at which the intensity of the beam is half of its maximum intensity at the center. This is known as full width at half the maximum (FWHM). In a preferred embodiment, D=8–10 min. An axis 110 is located a distance D/4 away from the axis 16 and runs parallel to it. Note, that curves 104 and 106 are symmetric with respect to axis 110, but are nonsymmetric with respect to axis 16. A center point 112 is located along axis 110 and is used to define curves 104 and 106. Curve 104 is a circular arc of radius R1 centered at point 112. Curve 106 is circular arc of radius R2 centered at point 112. In the preferred embodiment, $0.25D \leq R2 \leq R1 \leq 0.60D$. In a first embodiment, R1=0.5D and R2=0.4D and in a second embodiment R1=0.4D and R2=0.3D.

Numerous other circular curves are possible for use and forming the toroidal lens. In addition, the curves may be noncircular. Preferably, each curve is symmetrical about axis 110.

Figure 4:
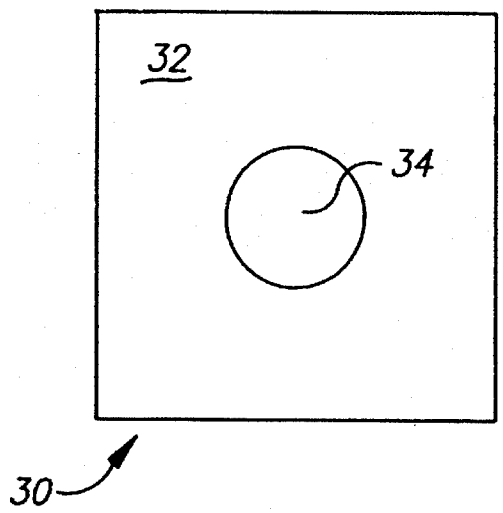
FIG. 4 is a frontal view of a phase plate of the present invention.

FIG. 4 shows a frontal view of the wave plate 30. The outer portion 32 is made of a transparent material such as glass. The inner portion 34 is made of a half waveplate material such as calcite.

Figure 5:
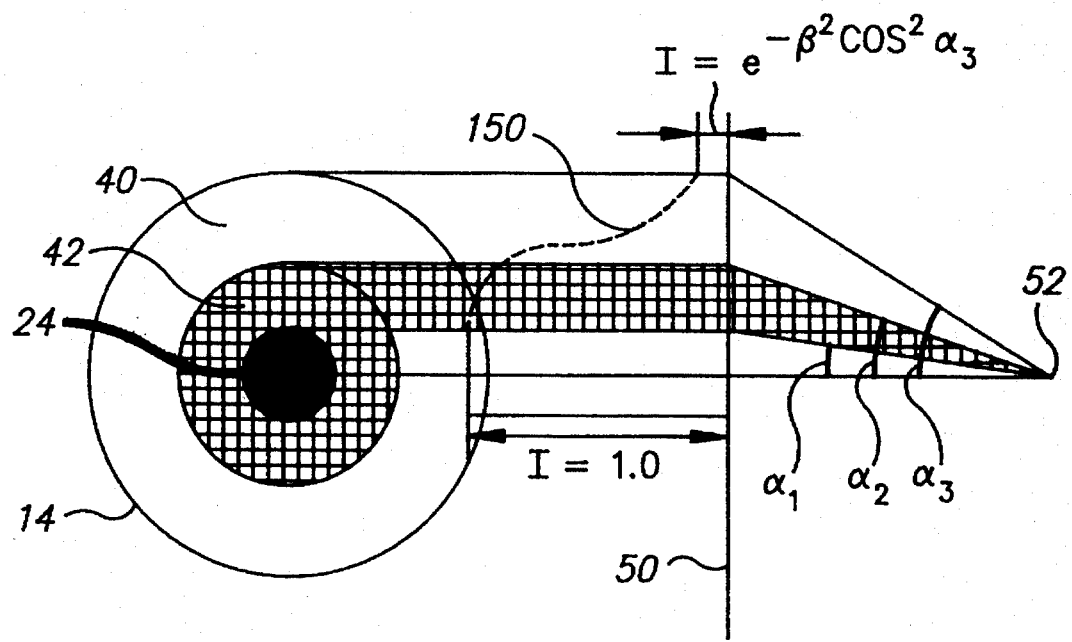
FIG. 5 is a diagram showing beam intensity and phase for the present invention.

FIG. 5 shows a schematic diagram of the beam 14 and lens 50. As described above, after beam 14 exists the toroidal lens 20 and the plate 30, the beam has an outer annular portion 40 and an inner annular portion 42 which surrounds a portion 24 which has no light at all. The beam 14 passes through lens 50 and focuses to spot 52. An angle $\alpha_1$ represents the inner boundary of portion 42. An angle $\alpha_2$ represents the boundary between portion 40 and 42. An angle $\alpha_3$ represents the outer boundary of the portion 40.

A curve 150 represents the normalized intensity of the beam 14 at different cross sectional locations. The intensity is maximum at the inner boundary of portion 42 and is equal to 1.0. The intensity is at a minimum at the outer boundary of portion 40 and is equal to $e^{-B^2 cos^2 \alpha_3}$. The values for $\alpha_1$, $\alpha_3$, B are determined by the shape of the toroidal lens and the focus lens 50. The value for $\alpha_2$ is determined by the diameter of portion 34 of waveplate 32. For the present invention, $15° \leq \alpha_3 \leq 45°$; $0.3\alpha_3 \leq \alpha_1 \leq 0.7\alpha_3$; $\alpha_1 < \alpha_2 < \alpha_3$; and $1 \leq B \leq 4$. Numerous convex and concave curves circular and noncircular may be used to generate the surfaces of the toroidal lens as long as they satisfy these requirements. These curves may be generated using optical software programs which are currently available, such as Super Oslo, by Sinclair Optics. In a preferred embodiment, for noncircular curves, $\alpha_1$ equals 16 degrees, $\alpha_2$ equals 22 degrees, $\alpha_3$ equals 33 degrees, and B equals 2.0.

The toroidol lens of the present invention decreases the focus spot size significantly. Spot diameters are reduced from 30 to 40 percent. This is accomplished while at the same time, the depth of focus of the focussing lens is increased by up to 40 percent. This is especially important to optical data storage systems where decreased spot size results in increased data density.

Figure 6:
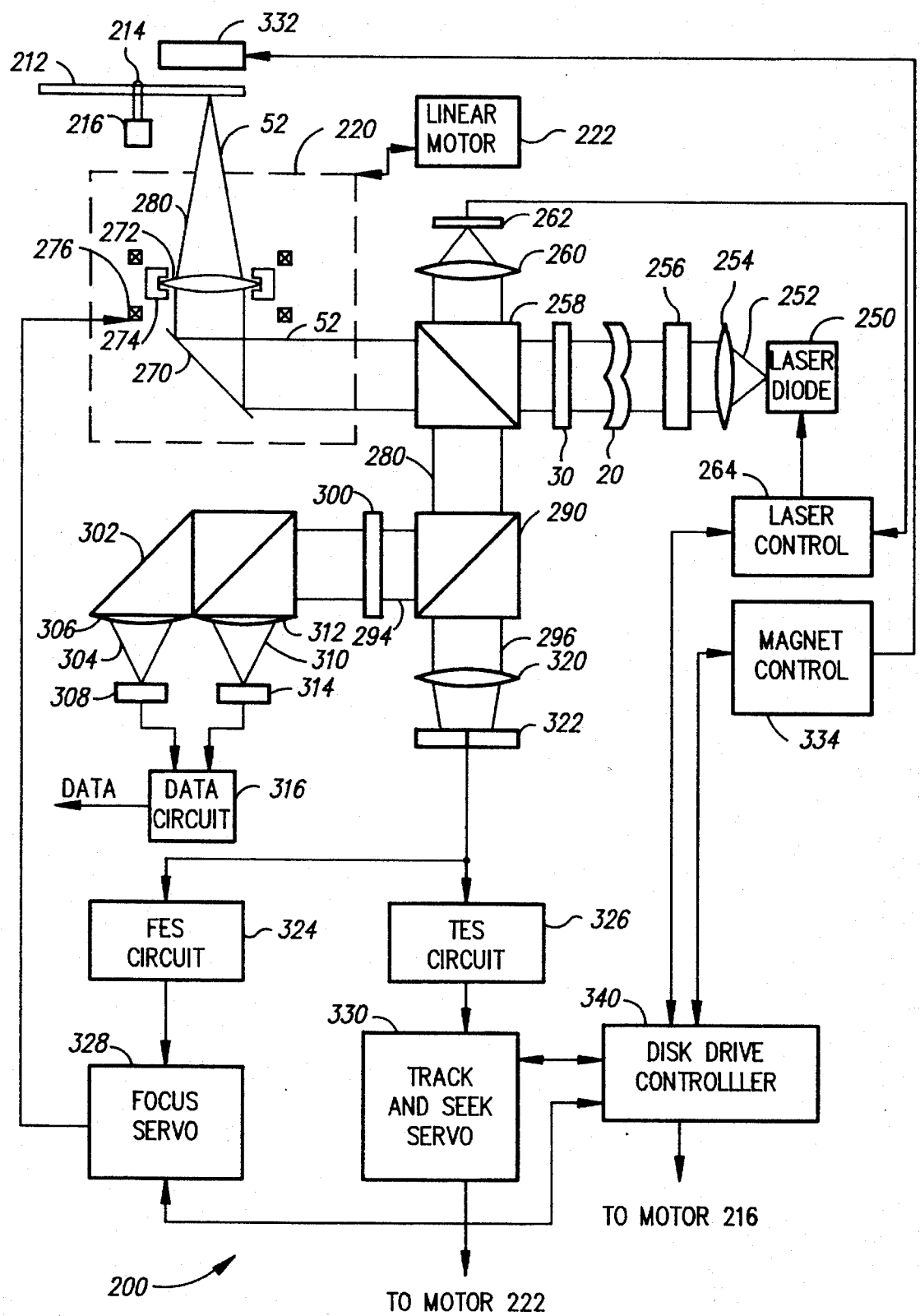
FIG. 6 is a schematic diagram of an optical data stored system of the present invention.

FIG. 6 is a schematic diagram of an optical data storage system of the present invention and is designated by the general reference number 200. System 200 includes an optical data storage medium 212. Medium 212 is preferably a magneto-optic disk which has concentric or spiral data tracks as is known in the art. Medium 212 is mounted on a spindle 214 which is attached to a spindle motor 216. Spindle motor 216 rotates spindle 214 and medium 212.

An optical head 220 is positioned below medium 212. Head 220 is moved in a radial direction relative to disk 212 by a linear motor 222.

A laser 250 produces a polarized light beam 252. Laser 250 is preferably a gallium-aluminum-arsenide laser diode which generates light at approximately 780 nm in wavelength or an aluminum-gallium-indium phosphate laser diode which generates light at approximately 670 nm in wavelength. Alternatively, any other type of laser may be used. Light beam 252 is collimated by a lens 254 and circularized by a circularizer 256. Circularizer 256 is preferably a prism. The beam 252 passes through toroidal lens 20 and waveplate 30.

Beam 252 passes to a beamsplitter 258. A portion of beam 252 is reflected toward a lens 260. Lens 260 focuses the light to a power monitor optical detector 262. Detector 262 is connected to a laser control 264. Detector 262 provides laser control 264 with a power monitor signal which is used to adjust the power of laser 250 as appropriate.

The remaining portion of beam 252 passes through beamsplitter 258 to a mirror 270. Mirror 270 reflects the light toward a focussing lens 272. Lens 272 focuses beam 252 onto the optical medium 212. Lens 272 is mounted in a lens holder 274. Holder 274 may be moved relative to the disk by an actuator motor 276. Mirror 270, lens 272, holder 274 and motor 276 are preferably located in the optical head 220.

A light beam 280 is reflected from the medium 212, passes through lens 272 and is reflected by mirror 270. A portion of the light beam 270 is then reflected by beamsplitter 258 to a beamsplitter 290. Beamsplitter 290 divides the beam 280 into a data beam 294 and a servo beam 296.

Data beam 294 passes through a half waveplate 300 to a polarizing beamsplitter 302. Beamsplitter 302 divides beam 294 into two orthogonal polarizations components. A first polarization component beam 304 is focussed by a lens 306 to a data detector 308. A second polarization component beam 310 is focussed by a lens 312 to a data optical detector 314. A data circuit 316 is connected to detectors 308 and 314 and generates a data signal representative of the data encoded on medium 212.

Servo beam 296 is focussed by lens 320 onto a segmented optical detector 322 as is known in the art. A focus error signal (FES) circuit 324 and a tracking error signal (TES) circuit 326 are connected to detector 322. A focus servo 328, as is known in the art, is connected to circuit 324 and motor 276. Servo 328 receives a FES from circuit 324 and controls motor 276 to adjust the position of lens 272 as appropriate. A track and seek servo 330, as is known in the art, is connected to circuit 326 and motor 222. Servo 330 receives the TES from circuit 326 and causes motor 222 to adjust the position of head 220 as appropriate. A bias magnet 332 is positioned over the disk 212. A disk drive controller 340, as is known in the art, provides overall control for servo 328 and 330, as well as laser control 264 and motor 216.

The operation of system 200 may now be understood. When it is desired to write data on disk 212, controller 340 causes laser control 264 to energize laser 250 such that beam 252 is produced. Beam 252 is then directed to the disk 212 as explained above. Beam 252 is of sufficient power to heat the magneto-optical material of disk 212 to a temperature above its Curie temperature. At this temperature the magnetic domains of the material may be oriented in an opposite direction by bias magnet 332. Typically, the domains of the disk 312 are oriented in an original direction and bias magnet 332 is used to reverse the domains of those spots which beam 252 heats above the Curie temperature. Controller 340 causes laser control 264 to pulse beam 252 responsive to the data to be recorded.

During the read operation, controller 340 causes laser control 264 to energize laser 250 such that only a low power read beam 252 is produced. The power of beam 252 is adjusted such that it does not heat the medium of disk 212 to a temperature above its Curie temperature. This low power beam 252 is reflected by the disk 212 as beam 280. The data beam 294 is detected by detectors 308 and 314 and data circuit 316 generates a data signal.

In both the write and read modes, servo beam 296 is sensed by detector 322 and focus servo 328 and tracking servo 330 control motors 276 and 222, respectively, in order to keep beam 252 properly focused and on track.

The optical system of the present invention may also be used with other types of optical data storage systems. These include compact disk (CD), compact disk read only memory (CDROM), write once ready many (WORM), phase change media and dye media.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An optical system comprising:

a toroidal lens for receiving a radiation beam along a direction of propagation axis and for providing an annular radiation beam, the toroidal lens having a first surface comprised of a convex curve having a first axis normal to the surface of the curve and located in the same plane as the curve, the convex curve being rotated about a central axis which is offset from the first axis, and a second surface comprised of a concave curve having a second axis normal to the surface of the curve and located in the same plane as the curve, the concave curve being rotated about the central axis which is offset from the second axis, with the central axis, first axis, second axis and the direction of propagation axis all being substantially parallel to one another; and a phase shift device for receiving the radiation beam from the toroidal lens and shifting a phase of an outer annular portion of the annular radiation beam relative to an inner annular portion of the annular radiation beam such that the phase difference is equal to one half of the wavelength of the radiation beam.

2. The system of claim 1, wherein the concave and convex curves intersect the central axis.

3. The system of claim 1, wherein the width of the toroidal lens is at least equal to D, where D is the diameter of the radiation beam.

4. The system of claim 3, wherein the distance from the central axis to the first axis and the distance from the central axis to the second axis are both substantially equal to D/4.

5. The system of claim 1, wherein the convex curve is a circular arc.

6. The system of claim 1, wherein the concave curve is a circular arc.

7. The system of claim 1, wherein the convex curve is a first circular arc of radius R1 and the concave curve is a second circular arc of radius R2 and the first and second circular arcs have the same center point.

8. The system of claim 7, wherein $0.25D \leq R2 \leq R1 \leq 0.60D$, where D is the diameter of the radiation beam.

9. The system of claim 1, further comprising a radiation source for producing the radiation beam.

10. The system of claim 9, further comprising a radiation collimating element located between the radiation source and the toroidal lens and a radiation focussing element located between the phase shift device and a target element.

11. The system of claim 1, wherein the phase shift device comprises a plate having an inner circular portion of a half waveplate material and an outer portion of a nonwaveplate material.

12. The system of claim 11, wherein the diameter of the inner circular portion is greater than the inner diameter (ID) of the annular radiation beam and less than the outer diameter (OD) of the annular radiation beam.

13. The system of claim 12, wherein the diameter of the circular portion is substantially equal to (OD+ID)/2.

14. An optical system comprising:

an optical data storage medium;

a radiation source for producing a radiation beam;

a toroidal lens for receiving a radiation beam along a direction of propagation axis and for providing an annular radiation beam, the toroidal lens having a first surface comprised of a convex curve having a first axis normal to the surface of the curve and located in the same plane as the curve, the convex curve being rotated about a central axis which is offset from the first axis, and a second surface comprised of a concave curve having a second axis normal to the surface of the curve and located in the same plane as the curve, the concave curve being rotated about the central axis which is offset from the second axis, with the central axis, first axis, second axis and the direction of propagation axis all being substantially parallel to one another;

a phase shift device for receiving the radiation beam from the toroidal lens and shifting a phase of an outer annular portion of the annular radiation beam relative to an inner annular portion of the annular radiation beam such that the phase difference is equal to one half of the wavelength of the radiation beam;

a focussing device for focusing the annular radiation beam to the optical data storage medium; and a reception device for receiving a radiation beam from the optical data storage medium and producing a data signal responsive thereto.

15. The system of claim 14, wherein the concave and convex curves intersect the central axis.

16. The system of claim 14, wherein the width of the toroidal lens is at least equal to D, where D is the diameter of the radiation beam.

17. The system of claim 16, wherein the distance from the central axis to the first axis and the distance from the central axis to the second axis are both substantially equal to D/4.

18. The system of claim 14, wherein the convex curve is a circular arc.

19. The system of claim 14, wherein the concave curve is a circular arc.

20. The system of claim 14, wherein the convex curve is a first circular arc of radius R1 and the concave curve is a second circular arc of radius R2 and the first and second circular arcs have the same center point.

21. The system of claim 20, wherein $0.25D \leq R2 \leq R1 \leq 0.60D$, where D is the diameter of the radiation beam.

22. The system of claim 14, wherein the phase shift device comprises a plate having an inner circular portion of a half waveplate material and an outer portion of a nonwaveplate material.

23. The system of claim 22, wherein the diameter of the inner circular portion is greater than the inner diameter (ID) of the annular radiation beam and less than the outer diameter (OD) of the annular radiation beam.

24. The system of claim 23, wherein the diameter of the circular portion is substantially equal to (OD+ID)/2.

* * * * *